US012605778B2

(12) United States Patent
Oh et al.

(10) Patent No.: US 12,605,778 B2
(45) Date of Patent: Apr. 21, 2026

(54) ASSEMBLY OF A CUTTING INSERT AND A TOOL HOLDER

(71) Applicant: KORLOY INC., Seoul (KR)

(72) Inventors: Min Seok Oh, Cheongju-si (KR); Ki Chan Nam, Cheongju-si (KR); Nam Seon Lee, Cheongju-si (KR)

(73) Assignee: KORLOY INC., Seoul (KR)

( * ) Notice: Subject to any disclaimer, the term of this patent is extended or adjusted under 35 U.S.C. 154(b) by 515 days.

(21) Appl. No.: 18/248,686

(22) PCT Filed: Aug. 30, 2021

(86) PCT No.: PCT/KR2021/011571
§ 371 (c)(1),
(2) Date: Apr. 11, 2023

(87) PCT Pub. No.: WO2022/145620
PCT Pub. Date: Jul. 7, 2022

(65) Prior Publication Data
US 2023/0381872 A1 Nov. 30, 2023

(30) Foreign Application Priority Data

Dec. 28, 2020 (KR) ........................ 10-2020-0184575

(51) Int. Cl.
*B23C 5/02* (2006.01)
*B23C 5/22* (2006.01)

(52) U.S. Cl.
CPC .... *B23C 5/2213* (2013.01); *B23C 2200/0422* (2013.01); *B23C 2200/126* (2013.01); *B23C 2210/168* (2013.01)

(58) Field of Classification Search
CPC .......... B23C 5/2213; B23C 2200/0422; B23C 2200/126; B23C 2210/168
(Continued)

(56) References Cited

U.S. PATENT DOCUMENTS 3,996,651 A * 12/1976 Heaton ............... B23B 27/1662
407/104
9,079,251 B2 * 7/2015 Dufour ................. B23B 27/145
(Continued)

FOREIGN PATENT DOCUMENTS

JP 4810902 B2 11/2011
JP 6048632 B1 12/2016
KR 1020180075935 A 7/2018

*Primary Examiner* — Jack W Lavinder
(74) *Attorney, Agent, or Firm* — Rabin & Berdo, P.C.

(57) ABSTRACT

A cutting insert of the present invention includes an upper surface, a lower surface, a side surface, a cutting edge, and a mounting hole penetrating the upper surface and the lower surface, in which the cutting edge includes a main cutting edge, a corner cutting edge extending from the main cutting edge, and a sub-cutting edge extending from the corner cutting edge, the side surface includes a main cutting edge flank surface and a sub-cutting edge flank surface, the main cutting edge flank surface includes a first main cutting edge flank surface extending from the main cutting edge, and a second main cutting edge flank surface extending from the lower surface, the sub-cutting edge flank surface includes a first sub-cutting edge flank surface extending from the sub-cutting edge, and a second sub-cutting edge flank surface extending from the lower surface, the first sub-cutting edge flank surface and the second sub-cutting edge flank surface together form a stepped portion, and the second sub-cutting edge flank surface protrudes from an imaginary plane extending from the first sub-cutting edge flank surface.

1 Claim, 11 Drawing Sheets

(58) Field of Classification Search
USPC ........................................... 407/69, 104, 113
See application file for complete search history.

(56) References Cited

U.S. PATENT DOCUMENTS

| | | | | |
|---|---|---|---|---|
| 9,956,619 | B2 * | 5/2018 | Okamura ............... | B23B 27/145 |
| 2010/0215446 | A1 * | 8/2010 | Wandeback ............ | B23C 5/202 |
| | | | | 407/51 |
| 2013/0142580 | A1 * | 6/2013 | Konta .................... | B23C 5/109 |
| | | | | 407/100 |

* cited by examiner

Prior Art

ASSEMBLY OF A CUTTING INSERT AND A TOOL HOLDER

TECHNICAL FIELD

The present invention relates to a cutting insert and an assembly of a tool holder equipped with the cutting insert.

BACKGROUND ART

Generally, a cutting insert is mounted to a cutting tool mounted to a machine tool and used for cutting a workpiece such as a machine part and so on that is made of iron, non-ferrous metal, non-metal material, and so on.

Such a cutting insert includes an upper surface, a lower surface oriented in the opposite direction, a side surface joining the upper surface and the lower surface to each other, and a cutting edge forming a boundary between the upper surface and the side surface, which is configured substantially to cut a workpiece.

Meanwhile, FIGS. 10 and 11 show a cutting insert 1 disclosed in JP4810902B. For reference, FIGS. 10 and 11 correspond to FIGS. 2 and 3 of JP4810902B respectively, and for convenience of description, reference numerals used in JP4810902B are used as they are without modification, and the reference numerals do not necessarily refer to the same components even if they overlap with the reference numerals used in the following description of the of the present invention.

In a positive type cutting insert such as the related cutting insert 1, the area of the lower surface (bottom surface) of the cutting insert in contact with the tool holder is determined by the angle of the flank surface. When assembling this positive type cutting insert to a tool holder, it is possible to improve sharpness by applying a large setting angle in the positive direction so as to increase the clearance angle of the sub-cutting edge flank surface, but as the clearance angle increases, the lower surface (bottom surface) decreases, and in an environment with poor cutting conditions, vibration generated during processing may not only damage the cutting insert but also adversely affect the workpiece.

Specifically, in the related cutting insert 1, as shown in FIG. 10, the width of the first flank surface 16a of the main cutting edge is not constant and varies. As a result, the area of the second flank surface 16b of the main cutting edge in contact with the cutting tool is reduced, resulting in the deteriorating stability when mounting the cutting insert to the tool holder.

In addition, in the related cutting insert 1, as shown in FIG. 11, the sub-cutting edge flank surface 16 is a single surface, and the clearance angle is constant, and as a result, the area of the seating surface 3 in contact with the tool holder is reduced, resulting in the problem of deteriorating stability when mounting the cutting insert to the tool holder.

DETAILED DESCRIPTION OF INVENTION

Technical Problem

The present invention has been made to solve the problems described above, and an object of the present invention to provide a cutting insert that can be stably mounted to the tool holder even in the cutting process, and that can effectively prevent the cutting insert from being separated from the tool holder by the impact generated during processing, and an assembly of the tool holder equipped with the cutting insert.

Technical Solution

In order to achieve the above object, a cutting insert according to an embodiment of the present invention may include an upper surface, a lower surface, a side surface, a cutting edge, and a mounting hole penetrating the upper surface and the lower surface, in which the cutting edge may include a main cutting edge, a corner cutting edge extending from the main cutting edge, and a sub-cutting edge extending from the corner cutting edge, the side surface may include a main cutting edge flank surface and a sub-cutting edge flank surface, the main cutting edge flank surface may include a first main cutting edge flank surface extending from the main cutting edge, and a second main cutting edge flank surface extending from the lower surface, the sub-cutting edge flank surface may include a first sub-cutting edge flank surface extending from the sub-cutting edge, and a second sub-cutting edge flank surface extending from the lower surface, the first sub-cutting edge flank surface and the second sub-cutting edge flank surface may together form a stepped portion, and the second sub-cutting edge flank surface may protrude from an imaginary plane extending from the first sub-cutting edge flank surface.

In addition, a first locking jaw may be formed between the first sub-cutting edge flank surface and the second sub-cutting edge flank surface by the stepped portion.

In addition, when the cutting insert is viewed into the lower surface, four enlarged support surfaces may be formed outside an intersection line of the lower surface and an extension plane of a surface of the first sub-cutting edge flank surface.

In addition, a width from the upper surface to the lower surface of the first main cutting edge flank surface may be constant.

An assembly of a cutting insert and a tool holder, which may be equipped with the cutting insert described above may be provided, in which the tool holder may include a pocket portion in which the cutting insert is seated, the pocket portion may include a first side mounting surface, a second side mounting surface, a recess portion positioned between the first side mounting surface and the second side mounting surface, and a bottom mounting surface, the recess portion may include a first recess portion in a direction away from the bottom mounting surface, and a recess surface portion that is stepped with the first recess portion and protrudes relatively further from a virtual extension plane of a surface of the first recess portion, and the first recess portion and the recess surface portion may form a second locking jaw.

In addition, the second main cutting edge flank surface of the cutting insert may be supported on the first side mounting surface, another second main cutting edge flank surface of the cutting insert may be supported on the second side mounting surface, the lower surface may be supported on the bottom mounting surface, and the first sub-cutting edge flank surface may form a predetermined gap with the recess surface portion, in which the first locking jaw may protrude into a space formed in the first recess portion.

Advantageous Effects

The cutting insert according to the embodiment of the present disclosure having the configuration described above has the following effects.

Since the second sub-cutting edge flank surface is protruded relatively further with respect to the first sub-cutting edge flank surface, even when the clearance angle of the first sub-cutting edge flank surface is increased, the area of the lower surface in contact with the tool holder is not reduced, and accordingly, it is possible to improve machining performance without sacrificing mounting stability.

In addition, by maintaining a width of the first main cutting edge flank surface constant, it is possible to ensure that the second main cutting edge flank surface is in contact with the tool holder in as large area as possible, and accordingly, it is possible to improve the stability of mounting to the tool holder.

In addition, in a state in which the cutting insert is seated in the pocket of the tool holder, the first sub-cutting edge flank surface forms a predetermined gap with the recessed surface portion, and at this time, the first locking jaw of the cutting insert protrudes into the space formed in the first recess portion of the tool holder such that, when the impact from the cutting process is applied to the cutting insert during cutting, the first locking jaw of the cutting insert comes into contact with the second locking jaw of the tool holder and is caught, thereby preventing the cutting insert from separating from the bottom mounting surface of the pocket portion.

Meanwhile, it goes without saying that the present invention includes other effects, although not explicitly stated, that can be expected from the configuration described above.

BEST MODE FOR EMBODYING INVENTION

Hereinafter, preferred embodiments of the present invention will be described in detail with reference to the accompanying drawings, which will be readily apparent to those skilled in the art to which the present invention pertains. However, it will be understood that the present invention can be implemented in various other different forms and should not be construed as being limited to certain examples described herein.

Figure 1:
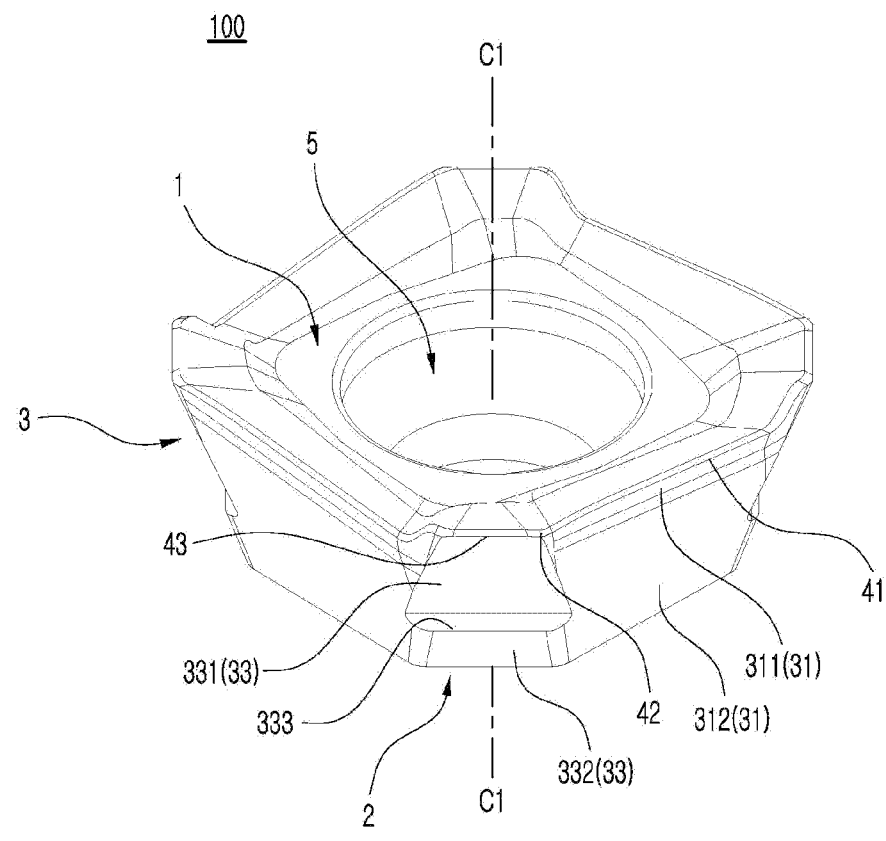
FIG. 1 is a perspective view of a cutting insert according to an exemplary embodiment of the present invention.
Figure 2:
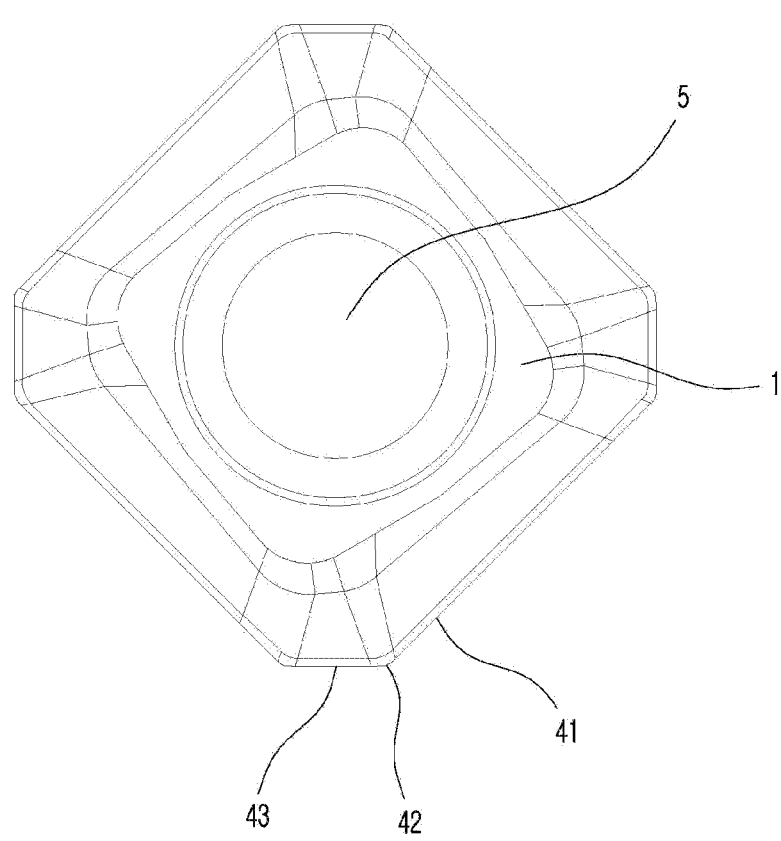
FIG. 2 is a view of the cutting insert of FIG. 1 viewed from above.

As shown in FIG. 1, a cutting insert 100 according to one embodiment of the present invention includes an upper surface 1, a lower surface 2, a side surface 3, a cutting edge 4, and a mounting hole 5 penetrating the upper surface 1 and the lower surface 2. When viewed from the upper surface 1, the cutting insert 100 of the present embodiment has an approximate quadrangular shape and is a one-sided cutting insert. In addition, it may be approximately 180° rotationally symmetrical with respect to a virtual center line Cl passing through the center of the mounting hole 5.

Figure 4:
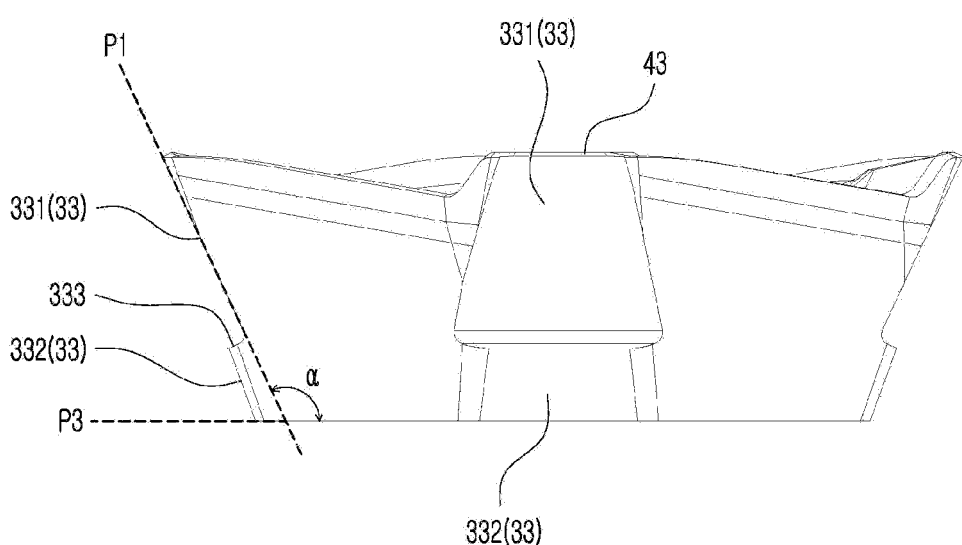
FIG. 4 is a side view of the cutting insert of FIG. 1 viewed from a direction of a sub-cutting edge flank surface.

In addition, the cutting insert 100 is a positive type cutting insert. For reference, by the "positive type," it refers to the type in which an angle α formed between an extension line P3 of the lower surface and an extension line P1 of the flank surface is the obtuse angle, as shown in FIG. 4. In this case, the angle α refers to an angle toward the upper surface of the cutting insert. In addition, by the "negative type," it refers to the type in which the angle α is the right angle.

The cutting edge 4 includes a main cutting edge 41, a corner cutting edge 42 extending from the main cutting edge 41, and a sub-cutting edge 43 extending from the corner cutting edge 42.

The side surface 3 includes a main cutting edge flank surface 31 and a sub-cutting edge flank surface 33.

The main cutting edge flank surface 31 includes a first main cutting edge flank surface 311 extending from the main cutting edge 41 and a second main cutting edge flank surface 312 extending from the lower surface 2.

The sub-cutting edge flank surface 33 includes a first sub-cutting edge flank surface 331 extending from the sub-cutting edge 43 and a second sub-cutting edge flank surface 332 extending from the lower surface 2.

As shown in FIGS. 1 and 4, the first sub-cutting edge flank surface 331 and the second sub-cutting edge flank surface 332 together form a stepped portion, and the second sub-cutting edge flank surface 332 protrudes from an imaginary plane P1 extending from the first sub-cutting edge flank surface 331. A first locking jaw 333 is formed between the first sub-cutting edge flank surface 331 and the second sub-cutting edge flank surface 332 by the stepped portion.

Figure 5:
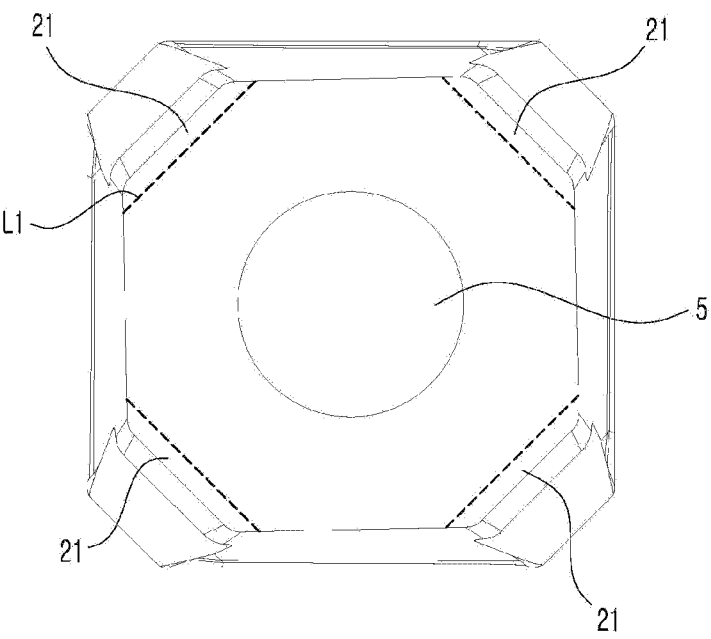
FIG. 5 is a view of the cutting insert of FIG. 1 viewed from a lower surface.

In this way, as the second sub-cutting edge flank surface 332 protrudes relatively further from the first sub-cutting edge flank surface 331, as shown in FIG. 5, when the cutting insert is viewed from the lower surface, compared to the related cutting insert, there are four enlarged support surfaces 21 provided outside an intersection line L1 of the imaginary plane P1 and the lower surface 2. In this case, by "outside the intersection line L1," it refers to a surface radially outside the intersection line L1 with respect to a through hole 5. Through this, even when the clearance angle of the first sub-cutting edge flank surface 331 is increased, the area of the lower surface 2 in contact with the tool holder is not reduced, and accordingly, it is possible to improve machining performance without sacrificing mounting stability. In contrast, the related cutting insert has a problem in that, when the clearance angle of the sub-cutting edge flank surface is increased in order to improve machining performance, the area of the lower surface is also reduced, resulting in poor mounting stability.

Figure 3:
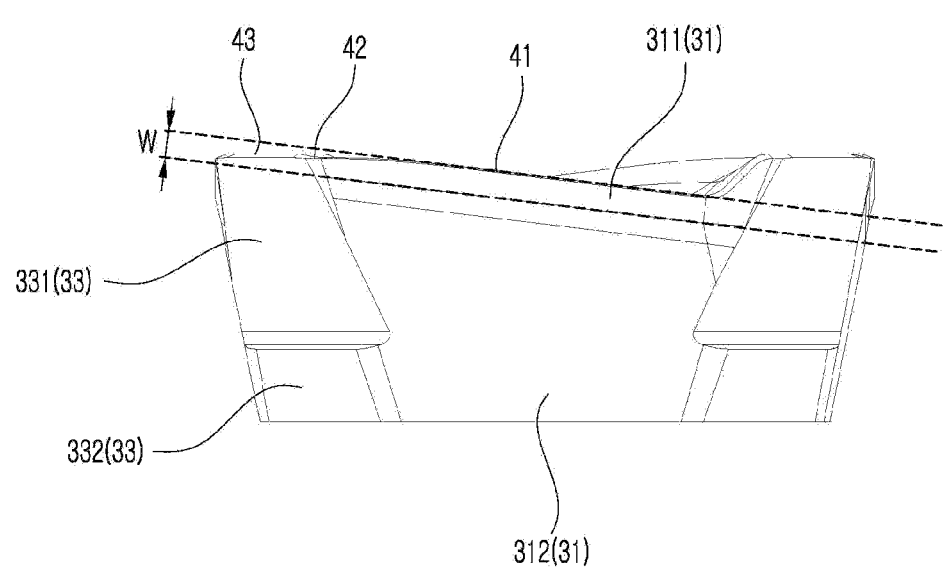
FIG. 3 is a side view of the cutting insert of FIG. 1 viewed from a direction of a main cutting edge flank surface.
Figure 10:
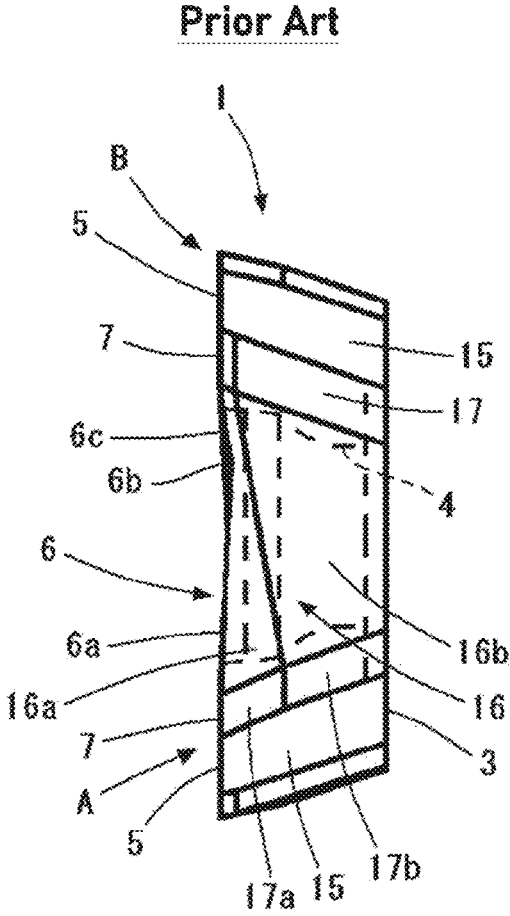
FIGS. 10 and 11 show an example of a related cutting insert.
Figure 11:
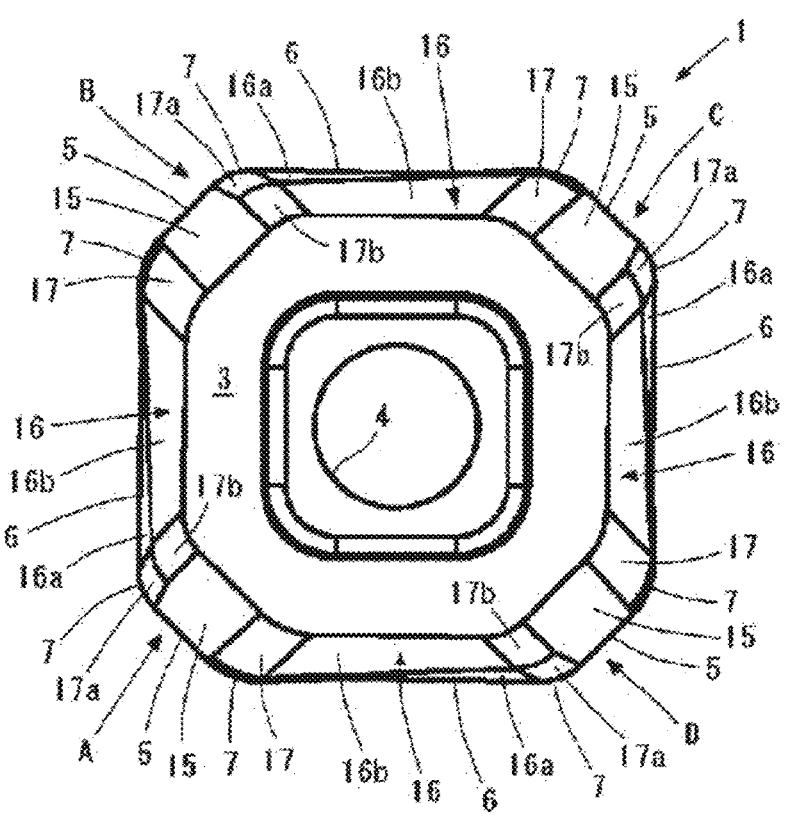

Meanwhile, as shown in FIG. 3, the width (w) in the direction from the upper surface 1 to the lower surface 2 of the first main cutting edge flank surface 311 is constant. Through this, it is possible to ensure the maximum area of the second main cutting edge flank surface 312 in contact with the tool holder, and thus improve the stability of mounting to the tool holder. On the other hand, the related cutting insert has a problem in that the width of the main cutting edge flank surface extending from the main cutting edge is expanded from one direction to the other direction, and as a result, the contact area with the tool holder is reduced, resulting in poor stability of mounting to the tool holder (see FIG. 10).

Hereinafter, the assembly of the cutting insert 100 and a tool holder 500 equipped with the cutting insert described above will be described with reference to FIGS. 6 to 9.

5

Figure 6:
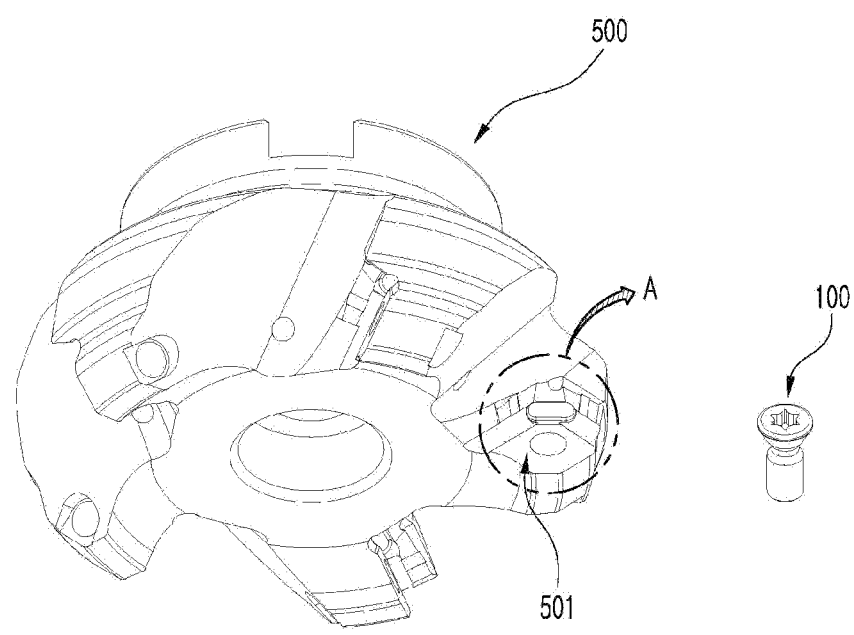
FIG. 6 shows an assembly of the cutting insert of FIG. 1 and a tool holder.
Figure 7:
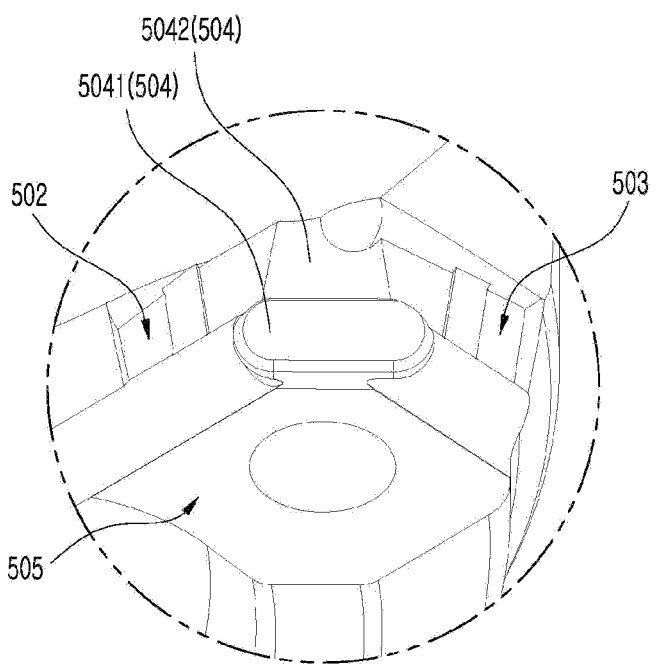
FIG. 7 is a partially enlarged view of the pocket portion of the tool holder of FIG. 6.

As shown in FIGS. 6 and 7, the tool holder (cutter) 500 includes a pocket portion 501 in which the cutting insert 100 is seated.

Specifically, the pocket portion 501 includes a first side mounting surface 502, a second side mounting surface 503, a recess portion 504 positioned between the first side mounting surface 502 and the second side mounting surface 503, and a bottom mounting surface 505.

In this example, the recess portion 504 includes a first recess portion 5041 and a recess surface portion 5042, respectively positioned in a direction away from the bottom mounting surface 505.

Figure 8:
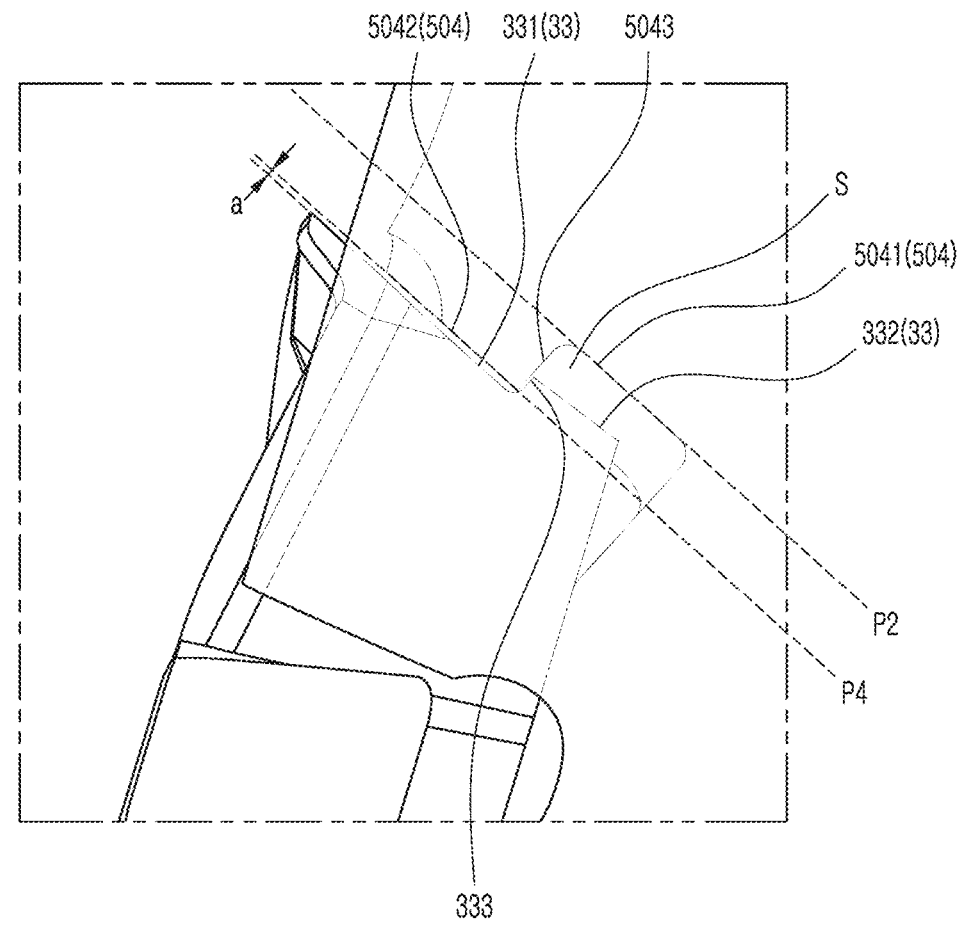
FIG. 8 shows the assembly of FIG. 6, with the cutting insert being mounted to the pocket portion.

As shown in FIG. 8, the recessed surface portion 5042 is stepped from the first recess portion 5041 and protrudes relatively further from an imaginary extension plane P2 of the surface of the first recess portion 5041. Through this, the first recess portion 5041 and the recessed surface portion 5042 form a second locking jaw 5043.

Meanwhile, the second main cutting edge flank surface 312 of the cutting insert 100 is supported on the first side mounting surface 502, the other second main cutting edge flank surface 312 of the cutting insert 100 is supported on the second side mounting surface 503, and the lower surface 2 is supported on the bottom mounting surface 505.

As shown in FIG. 8, in a state in which the cutting insert 100 is seated in the pocket 501 of the tool holder 500, the first sub-cutting edge flank surface 331 forms a predetermined gap (a) with the recess surface portion 5042. The reference character P4 in FIG. 8 is the extension line of the recess surface portion 5042. At this time, the first locking jaw 333 of the cutting insert 100 protrudes into a space S formed in the first recess portion 5041 of the tool holder 500. Through this, when the impact from the cutting process is applied to the cutting insert during cutting, the first locking jaw 333 of the cutting insert 100 comes into contact with the second locking jaw 5043 of the tool holder 500 and is caught, thereby preventing the cutting insert 100 from separating from the bottom mounting surface 505 of the pocket portion 501.

Figure 9:
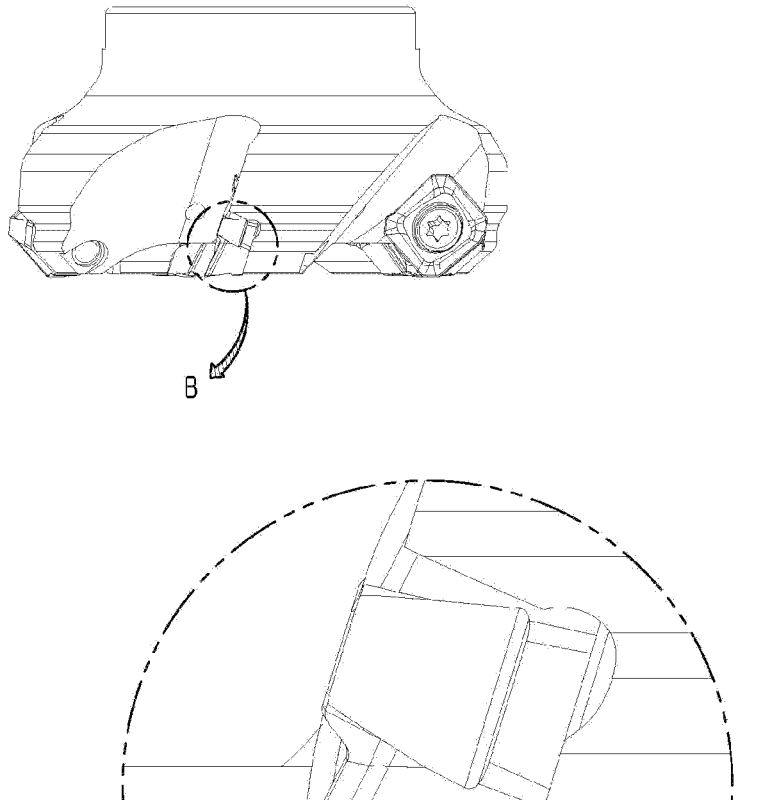
FIG. 9 is a view showing how the torque is decreased due to cutting force in the assembly of FIG. 6.

In addition, as shown in FIG. 9, for the cutting insert 100, the lower surface 2 is widened, and thus the torque (moment) by the cutting force F is reduced, and accordingly, the mounting stability is further increased. For reference, in FIG. 9, L2 represents a vertical distance between the support point and the cutting force F in the related cutting insert, and L1 represents a vertical distance between the support point and the cutting force F in the cutting insert of the present invention, respectively.

As described above, with the cutting insert and the tool holder according to the embodiment of the present invention, it is ensured that the second main cutting edge flank surface is in contact with the tool holder in as large area as possible so as to withstand the impact applied to the positive type cutting insert during cutting, and also, the configuration of the first locking jaw of the cutting insert and the second locking jaw of the tool holder can prevent the cutting insert from falling off.

Although the present invention has been described in connection with some examples herein, the present invention should not be limited to those examples only, and various other changes and modifications made by those skilled in the art from the basic concept of the disclosure are also within the scope of the claims appended herein.

INDUSTRIAL APPLICABILITY

The present invention can be used for a cutting tool for cutting a workpiece.

The invention claimed is:

1. An assembly of a cutting insert and a tool holder, the cutting insert comprising an upper surface, a lower surface, a side surface, a cutting edge, and a mounting hole penetrating the upper surface and the lower surface, wherein the cutting edge includes a main cutting edge, a corner cutting edge extending from the main cutting edge, and a sub-cutting edge extending from the corner cutting edge, the side surface includes a main cutting edge flank surface and a sub-cutting edge flank surface, the main cutting edge flank surface includes a first main cutting edge flank surface extending from the main cutting edge, and a second main cutting edge flank surface extending from the lower surface, the sub-cutting edge flank surface includes a first sub-cutting edge flank surface extending from the sub-cutting edge, and a second sub-cutting edge flank surface extending from the lower surface, the first sub-cutting edge flank surface and the second sub-cutting edge flank surface together form a stepped portion, and the second sub-cutting edge flank surface protrudes from an imaginary plane extending from the first sub-cutting edge flank surface, the tool holder comprising a pocket portion in which the cutting insert is seated, wherein the pocket portion includes a first side mounting surface, a second side mounting surface, a recess portion positioned between the first side mounting surface and the second side mounting surface, and a bottom mounting surface, the recess portion includes a first recess portion in a direction away from the bottom mounting surface, and a recess surface portion that is stepped relative to the first recess portion and protrudes relatively further from a virtual extension plane of a surface of the first recess portion, and the first recess portion and the recess surface portion form a second locking jaw, wherein the second main cutting edge flank surface of the cutting insert is supported on the first side mounting surface, and another second main cutting edge flank surface of the cutting insert is supported on the second side mounting surface, and the lower surface is supported on the bottom mounting surface, and the first sub-cutting edge flank surface forms a predetermined gap with the recess surface portion, in which a first locking jaw protrudes into a space formed in the first recess portion.

* * * * *